United States Patent [19]
Burt

[11] Patent Number: 5,159,647
[45] Date of Patent: Oct. 27, 1992

[54] FAST AND EFFICIENT SEARCH METHOD FOR GRAPHICAL DATA

[75] Inventor: Peter J. Burt, Princeton, N.J.

[73] Assignee: David Sarnoff Research Center, Inc., Princeton, N.J.

[21] Appl. No.: 663,513

[22] Filed: Mar. 4, 1991

[51] Int. Cl.$^5$ .............................................. G06K 9/68
[52] U.S. Cl. ...................................... 382/37; 382/36; 382/48; 395/51
[58] Field of Search ....................... 382/37, 48, 56, 14, 382/2, 36, 30, 38; 358/209; 364/513; 395/1, 21, 51, 80

[56] References Cited

U.S. PATENT DOCUMENTS

| | | | |
|---|---|---|---|
| 4,115,761 | 9/1978 | Ueda et al. | 382/37 |
| 4,692,806 | 9/1987 | Anderson | 358/209 |
| 4,944,023 | 7/1990 | Imao et al. | 382/37 |
| 5,058,184 | 10/1991 | Fukushima | 382/14 |
| 5,063,603 | 11/1991 | Burt | 382/37 |
| 5,067,165 | 11/1991 | Nishida | 382/37 |
| 5,067,166 | 11/1991 | Ito | 382/37 |

Primary Examiner—Joseph Mancuso
Attorney, Agent, or Firm—William J. Burke

[57] ABSTRACT

By processing the highest-resolution graphical data (e.g., image data) pertaining to relevant-objects defined by the graphical data into abstracted multiple-attribute information that is stored in a group of nodes of the lowest level of a hierarchy of data arrays (e.g., the leaf nodes of a complete data tree file), the present invention processes the data of each of these hierarchy of data arrays backward toward a single node of the highest level of the hierarchy of data arrays (e.g., the root node of a complete data tree file), to derive an attribute vector of all the abstracted multiple-attribute information at this single node. The derived attribute vector is then used to guide a search down the hierarchy of data arrays from the single node of its highest level toward at least a selected one of the group of nodes of its lowest level (which, by way of example, may correspond to the location of a likely relevant object). In this manner, a search made over a relatively large spatial domain for a relatively small relevant object can be converted into a search for the relevant object as described in the attribute domain of the hierarchy of data arrays, where such means as direct indexing may be used.

12 Claims, 4 Drawing Sheets

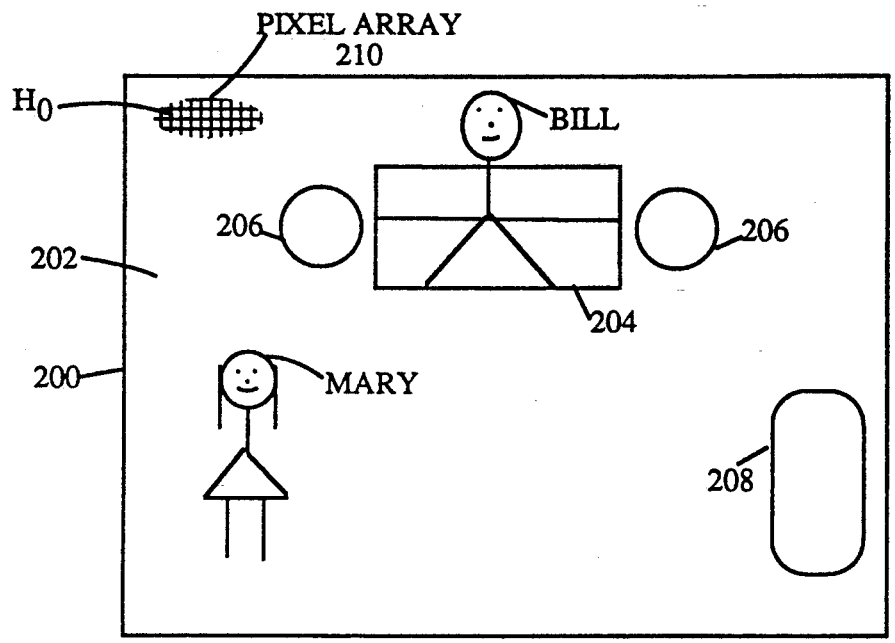
TELEVISION COLOR FRAME
FIGURE 2
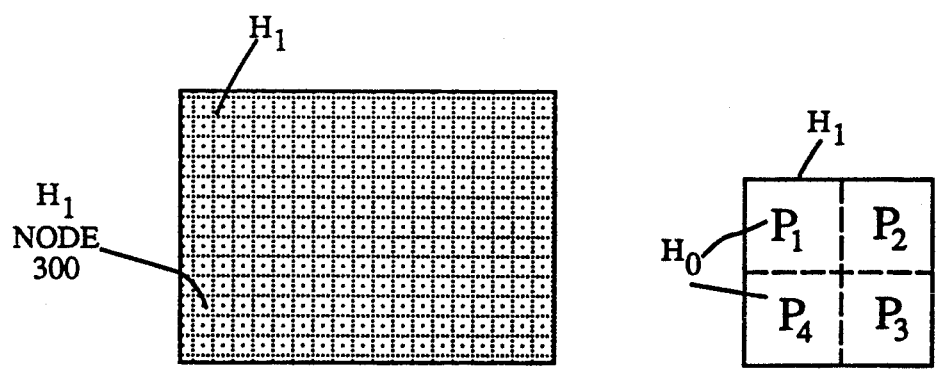
FIGURE 3a
FIGURE 3b

FAST AND EFFICIENT SEARCH METHOD FOR GRAPHICAL DATA

BACKGROUND OF THE INVENTION

The present invention, which relates generally to a search method for graphical data having one or more dimensions, is particularly suitable for searching through one or more frames of image data for the presence of one or more relevant objects therein that exhibit certain attributes. The term "graphical data", as used herein, means data that defines one or more characteristics of each of a matrix of points in a space of a given number of one or more dimensions (e.g., data represented in bit-map form or 'pixel arrays'). The present invention is not directed to a search method for data originally represented in a coded form (e.g., data represented in ASCII code form).

A task in computer vision is to rapidly search for relevant objects within a scene. For such tasks as surveillance, object recognition and navigation, these relevant objects may be objects or events of interest. For such tasks as stereo depth and motion tracking, these relevant objects may be distinctive patterns matched between views represented by distinct image frames. For such tasks as reading textual material in graphical form (e.g., optical character reading or the like), these relevant objects may be individual characters, individual words or individual word groups (e.g., particular phrases, sentences, etc.).

Such tasks usually require substantial computation, and often must be accomplished in real time, in response to ongoing events. The problem, therefore, is to provide a search computation procedure which is fast (i.e., least expected search time) and efficient (i.e., least expected computation cost). An exhaustive search, accomplished by a serial approach, that compares a known relevant object at every sample position, is both slow and inefficient. Accomplishing the search by a parallel approach, which uses arrays of many processing elements to perform the comparisons at many image positions at the same time, is fast but is still inefficient because the same total computation is performed as in the sequential search technique.

The best approach is a guided approach, which employs information gained during earlier steps of the search procedure to selectively direct later steps of the search procedure to only those image regions most likely to contain the relevant objects. In this regard, the prior art has developed search procedures in which a coarse-resolution step of a relatively large image region is followed by a fine-resolution step which is limited to only those one or more sub-regions thereof which have been found likely by the coarse-resolution step to contain the relevant object. A good example of such a coarse-fine guided approach is disclosed in U.S. Pat. No. 4,692,806, issued to Anderson et al. on Sept. 8, 1987.

Reference is also made to my U.S. Pat. No, 5,063,603, filed Nov. 6, 1989 and assigned to the same assignee as the present application. This patent, incorporated herein by reference, discloses a dynamic image-processing method for general object recognition. For illustrative purposes, as an example, this reference application specifically discloses viewing objects in a room with a color television camera to obtain a television motion picture thereof in real time, and then dynamically analyzing the image data of each of a series of successive frames of this television motion picture for the purpose of recognizing any of a group of known individual persons in the television motion picture if that known individual person is present in the room. The disclosed illustrative example of this dynamic image-processing method makes use of (1) initially stored attributes, including templates of the facial characteristics of each of the group of known individual persons (2) the attribute that the facial color (e.g., fleshtone) of all of the persons of the group is known, (3) the attribute that a person is a movable object, and (4) additional stored attributes dynamically derived by the image-processing method during earlier-occurring frames of the series which are used to aid the analysis during the current frame of the series. This permits a number of recognition attributes sufficient to identify a known individual person to be built up from the total number of different attributes of the known individual person contained in an entire series of frames, although the number of different attributes of the known individual person contained in any single frame of the series is insufficient to identify a known individual person. This disclosed illustrative example of the reference application's dynamic image-processing method employs such techniques as pattern matching, fleshtone color detection and moving-object detection in a coarse-to-fine guided approach to achieve the desired object recognition of each known individual person of the group who happens to be in the television motion picture.

The coarse-to-fine guided approach disclosed in the aforesaid Anderson et al patent may be utilized repetitively in an image-processing method that extracts the location, in each successive current frame of a series of television frames, of only those pixels (if any) which define the same specified single attribute (which consists of the same single detected predetermined feature of interest) in each successive current frame only if those pixels exhibit an absolute-value level at least equal to a threshold. This single predetermined feature of interest may comprise any given criterion (such as pattern shape, moving object, etc.), or a particular combination of a plurality of such given criteria.

SUMMARY OF THE INVENTION

The present invention is directed to an improvement to a guided search method that employs high-to-low resolution techniques to pre-compute and store which, if any, of "pooled" multiple predetermined attributes of relevant objects are represented in relatively high-resolution graphical data having one or more dimensions. These stored pooled multiple predetermined attributes then may be employed in a low-to-high resolution search to locate each of such relevant objects represented in the relatively high-resolution graphical data.

Specifically, in accordance with the improved method of the present invention, low-to-high resolution techniques may be used to locate any of one or more various types of relevant objects that may be represented in relatively high-resolution graphical data that occupies a given data domain $H_n$, where n 1, in which each type of relevant objects exhibits a different combination of one or more of multiple predetermined attributes. This is accomplished by first employing high-to-low resolution techniques to prepare a search guide comprised of a hierarchy of data arrays. A certain level of the hierarchy of data arrays comprises respective nodes that individually correspond to each of a plurality of data domains $H_{k-1}$ into which the given data domain $H_n$ has been divided, each data domain $H_{k-1}$ being smaller than a data domain $H_k$, where $1 \leq K \leq n$ and $0 \leq (k-1) < n$. Another one of these of the hierarchy of data arrays comprises at least one node that individually corresponds to a data domain $H_k$ which comprises a group of $H_{k-1}$ data domains. A first attribute vector is stored in the node corresponding to each $H_{k-1}$ data domain, which first attribute vector abstracts all attribute information defined by the graphical data contained in that $H_{k-1}$ data domain. A second attribute vector, which pools the multiple attribute information stored by the first attribute vectors in all those nodes corresponding to the group of $H_{k-1}$ data domains that comprise each $H_k$ data domain, stores information abstract from that group of $H_{k-1}$ data domains in the node corresponding to that $H_k$ data domain.

The desirable result is that a low-to-high resolution guided search may be made by employing the pooled abstracted multiple attribute information stored by the second attribute vector in a node corresponding to an $H_k$ data domain to select the attribute information stored by the first attribute vector of at least one of the nodes corresponding to the $H_{k-1}$ data domains of the group that comprises that $H_k$ data domain.

BRIEF DESCRIPTION OF THE DRAWING

FIG. 2, employed in an illustrative example of the search method of the present invention, shows a single one of a series of successive television color frames of image data defining an ongoing scene, which single frame happens to include certain relevant objects;

FIGS. 3a, 3b, 3c and 3d illustrate the "high-to-low resolution" techniques employed by the present invention in the "Preparing a Search Guide" step of FIG. 1.

DESCRIPTION OF THE PREFERRED EMBODIMENTS

Figure 1:
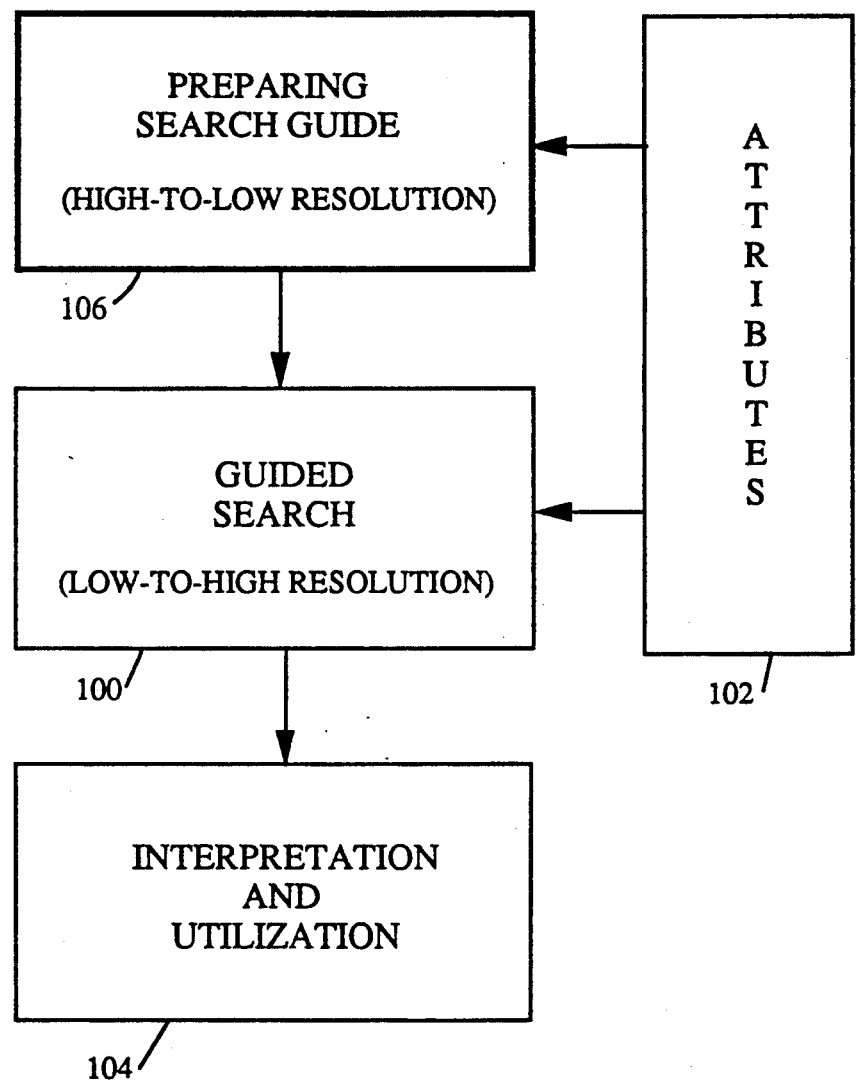
FIG. 1 is diagrammatic showing of a method incorporating the present invention for searching high-resolution graphical data having one or more dimensions to determine if any of relevant objects, each of which possesses certain multiple attributes is defined thereby.

Referring to FIG. 1, there is shown block 100, indicative of the steps employed in making a low-to-high resolution (i.e., coarse-to-fine resolution) guided search of graphical data of one or more dimensions to determine whether the data defines a given relevant object that exhibits certain known attributes, with data defining the known attributes being supplied to block 100 by block 102. Block 104 indicates that the results of the guided search made by block 100 are first interpreted and then, based on the interpretation, utilized for the ultimate purpose for which the search was being made.

A guided search method that is solely comprised of the steps indicated by blocks 100 and 104, with the required known attributes being supplied to block 100 by block 102, may be of the type of guided search method taught by the aforesaid Anderson et al. patent or by my aforesaid patent application. While such guided search methods can employ relevant-object information gained during an earlier coarse-resolution step of the search procedure to selectively direct a later fine-resolution step of the search procedure, thereby "homing in" on a relevant object, very little guidance information is available to direct the earlier steps and, in the case of the initial step, no guidance information at all is available. While this may not be much of a disadvantage in the case of the simplest of search tasks, it substantially increases the search time and computation cost in the case of more complex search tasks.

In accordance with the principles of the present invention (described in detail below), prior to making the guided search indicated by block 100, a search guide is prepared, as indicated by block 106, using the predetermined known multiple attributes supplied by block 102 and techniques that move from examination of the graphical data first at higher-resolution and then at lower resolution to abstract and store in a hierarchy of data arrays guidance information about relevant-object candidates that can be used to appreciably reduce the search time and computation cost of the guided search made by block 100.

In order for the present invention to be practical, the savings in search time and computation cost of the guided search made by block 100 must be significantly larger than the added time and computation cost required for preparing the search guide made by block 106. This criterion for practicality is met for all but the simplest of search tasks when the principles of the present invention are employed in preparing the search guide.

For tutorial purposes in disclosing the principles of the present invention, it will be assumed that block 106 is being employed to prepare a search guide helpful in connection with the image-processing method disclosed in my aforesaid patent application for color televising objects in a room, and then dynamically analyzing the image data of each of a series of successive frames of the television picture for the purpose of recognizing any of a group of known individual persons in the television picture if that known individual person is then present in the room. However, it should be understood that the type of search guide prepared by present invention is generally applicable to all kinds of graphical data having one or more dimensions.

Referring to FIG. 2, there is shown, in diagrammatic form, the scene defined by the image data of a single television color frame 200 of a series of successive television color frames. The scene is that of room 202 in which stationary objects comprised of sofa 204, end tables 206 and side table 208 are permanently located. Further, in the single television color frame 200 of the series, Bill, one of a group of known persons, happens seated on sofa 204 toward the back of room 202, while Mary, another one of the group of known persons, also happens to be standing toward the lower left of room 202. Both Bill and Mary are movable objects who may move around room 202, leave room 202 or, after leaving, reenter room 202. Further, there may be other known persons of the group who happen not to be present in room 202 at the time of occurrence of single television color frame 200, but may be present during the time of occurrence of other television color frames of the series.

It would be desirable to prepare a search guide (for use in the type of detailed guided search disclosed in my aforesaid patent application) which, at the very least, detects whether any person of the group is likely to be present in room 202 during any particular frame of the series, and, if so, provides a way of directing a guided search toward the location in room 202 of each detected person. Such a search guide would considerably speed up and reduce the computation cost of the detailed guided search.

The high-resolution image data filling the area data domain of frame 200 is defined by a two-dimensional color-pixel array 210 (a small portion of which is shown in magnified form). As known, each color pixel is composed of a luminance component Y, which is indicative of relative brightness level, and an in-phase chrominance component I and a quadrature chrominance component Q, which together are indicative of color hue. It is assumed that fleshtone is the facial color hue of all known persons within the group. Thus, fleshtone may be used as one of multiple attributes that distinguishes those image-data pixels that are likely to define the face of a known person of the group from those image-data pixels that do not. While there are other distinguishing attributes (such as that persons are movable objects, and include certain facial features—e.g., eyes, nose hair, etc.—that exhibit particular texture, color and pattern shapes), the following illustrative example, for the sake of simplicity, initially will be limited to a discussion of only the single distinguishing attribute of fleshtone.

Referring now to FIG. 3a, in accordance with the principles of the present invention, the entire area data domain of frame 200, designated $H_n$, is divided into a plurality of small-area data domains, each of which is designated $H_1$, that is larger than the data domain of a single color pixel, designated in FIG. 2 as $H_0$. For illustrative purposes, it is assumed that the area of each $H_1$ data domain is comprised of the area of a 2×2 array of the four adjacent $H_0$ data domains occupied by the four color-pixels respectively designated in FIG. 3b as $P_1$, $P_2$, $P_3$ and $P_4$.

Abstract information defined by the image-data of the four adjacent $H_0$ color pixels $P_1$, $P_2$, $P_3$ and $P_4$ within the area of each one of the $H_1$ data domains, with respect to a fleshtone attribute, may be extracted from these color pixels to show (1) that all four color pixels define fleshtone (indicative of the likelihood that $H_1$ data domain lies entirely within the face of a person depicted in the color frame) (2) some, but not all, four color pixels define fleshtone (indicative of the likelihood that $H_1$ data domain lies either at an outside edge or the edge of a facial feature, such as the eye, of the face of a person depicted in the color frame), or (3) none of the four color pixels define fleshtone (indicative of the likelihood that $H_1$ data domain lies either entirely outside of or entirely within a facial feature, such as the eye, of the face of a person depicted in the color frame). The image data of each of the four adjacent $H_0$ color pixels $P_1$, $P_2$, $P_3$ and $P_4$ making up a particular individual one of the $H_1$ data domains shown in FIG. 3a is used in two different ways. First, these four pixels of high-resolution image data are pooled (i.e. integrated) to derive a single lower-resolution pixel assigned to that particular individual one of the $H_1$ data domains. Second, the abstracted information is stored in a node 300 (indicated in FIG. 3a by a dot) corresponding to that particular individual one of the $H_1$ data domains. By way of an example, the abstracted information stored in a particular node 300, besides inherently identifying the spatial position of its corresponding $H_1$ data domain within the $H_n$ data domain, may employ a code to indicate whether fleshtone has been found in all, none, or some of the four $H_0$ color pixels of its corresponding $H_1$ data domain. In the case in which some, but not all, of the four $H_0$ color pixels of its corresponding $H_1$ data domain have been found to indicate fleshtone, it may or may not be desirable to also identify which particular ones of color pixels $P_1$, $P_2$, $P_3$ and $P_4$ indicate fleshtone.

Figure 3C:
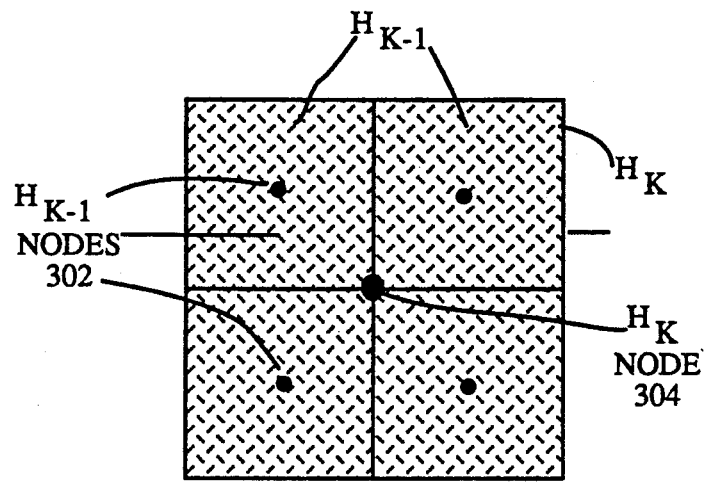
Figure 3D:
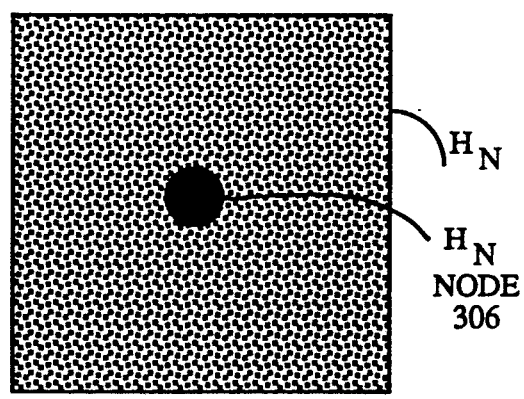

This process of both pooling of image data and abstracting image-data information is iteratively repeated for lower and lower resolution, larger and larger data domains, until all the image data is pooled into the single data domain $H_n$ (where n indicates the number of iterative cycles) constituting the entire area of frame 200. In this regard, reference is made to FIG. 3c, which is a general showing of the fact that the area of a data domain $H_k$ (where $1 \leq k \leq n$) is comprised of a 2×2 array of the areas of those four adjacent $H_{k-1}$ data domains which comprise it. Thus, as shown in FIG. 3d, when k=n, all of the image data is pooled in the single data domain $H_n$.

The abstraction of information for the case in which data domain $H_k$ comprises the $H_1$ data domain has been described above. However, the abstraction of information for the more general case in which data domain $H_k$ is higher than the $H_1$ data domain is somewhat more involved. In this more general case, previously abstracted information is already stored in each of the nodes 302 corresponding to the four adjacent $H_{k-1}$ data domains which comprise the individual one of the $H_k$ data domains shown in FIG. 3c. Therefore, in the more general case, this previously abstracted stored information is considered together with new information abstracted from the lower-resolution pixel image data of each of the four adjacent $H_{k-1}$ data domains to provide even greater abstracted information for storage in the node 304 corresponding to the individual one of the $H_k$ data domains shown in FIG. 3c. Thus, node 306, corresponding to the single $H_n$ data domain that contains the entire area of frame 200, stores the greatest amount of abstracted information (which then may be used as a guide for the detailed guided search by block 100). For illustrative purposes, the size of each node is indicative of the relative amount of abstracted information stored in that node. Therefore, nodes 302 of FIG. 3c are shown larger than nodes 300 of FIG. 3a; node 304 of FIG. 3c is shown larger than nodes 302 thereof, and node 306 of FIG. 3d is shown larger than node 304 of FIG. 3c.

The respective nodes form a hierarchy of data arrays of abstracted multiple-attribute information data, in which the plurality of nodes forming the lowest level of the hierarchy of data arrays corresponds to the attribute-defining pixels at the $H_0$ data domain level 210 and the single node the highest level of the hierarchy of data arrays corresponds to the abstracted multiple-attribute information data of the entire $H_n$ data domain level. In this case, the hierarchy of data arrays may take the form of a complete data-tree file, such as that shown in FIG. 4 (although, in general, the hierarchy of data arrays may take other forms than a data-tree file). In the complete data-tree file shown in FIG. 4, the single node at the highest level that corresponds to the $H_n$ data domain level constitutes the root node of the data tree, while the plurality of nodes at the lowest level that corresponds to the $H_0$ data domain level constitutes the leaf nodes of the data tree.

Assume now that the foregoing high-to-low resolution abstraction process of multiple distinguishing attributes, which includes the single distinguishing attribute of fleshtone, is performed by block 106 on the image data of each successive one of the series of frames. This permits the abstracted information stored in the root node of the $H_n$ data domain to be efficiently used in the low-to-high resolution guided search performed on the image data of each of the frames by block 100. For instance, first assume that no person happens to be present anywhere in room 202 during the occurrence of one or more certain frames of the series. In this case, the abstracted information stored in the root node of the $H_n$ data domain of any of these certain frames indicates this fact, so that no guided search at all need be performed on the image data of that certain frame. Now assume that the abstracted information stored in the root node of the $H_n$ data domain of frame 200 (shown in FIG. 2) of the series is examined. This abstracted information concerning fleshtone in the root node, at the very least, would indicate that persons are likely to be present within room 202. However, this abstracted information could be sufficiently detailed to define the location of those lower level data domains that correspond to the outside edge of each fleshtone color face of Bill or Mary, as well those that correspond to the inside fleshtone edge defining the outlines of Bill's and Mary's eyes. The availability of such abstracted information greatly reduces the search time and computation cost of a guided search performed by block 100.

Figure 4:
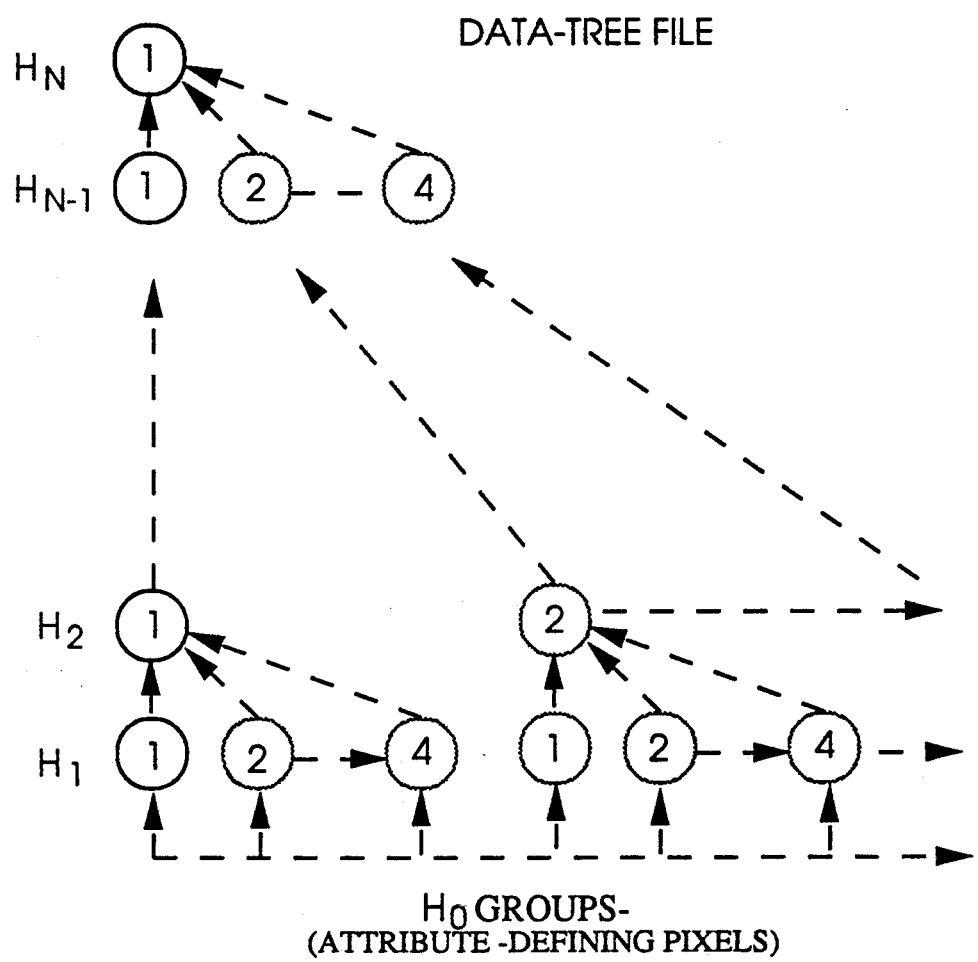
FIG. 4 illustrates the organization of a data-tree file of search-guide data abstracted from the image data of any of the series of successive television color frames in the illustrative example of FIG. 2.

Generalizing from the foregoing discussion of the fleshtone attribute example, it will be seen that the present invention may derive an abstraction-hierarchy structure of all the different multiple types of distinguishing attribute data stored in a data-tree file (shown in FIG. 4). In this case of image data, the different multiple types of distinguishing attribute data of the image may include, for example, average intensity, color, texture, and local pattern features such as edges. The abstraction hierarchy stored in a data-tree file is associated with an integration-image region domain hierarchy of increasing size (shown in FIGS. 3a–3d), and a list of attributes for each region is stored as a node of the FIG. 4 data-tree file. Each listed attribute stored in a node has a "type" and a "value". The type indicates the particular pattern characteristic that is being represented (e.g., color, texture, vertical edge). The value is a measure of that attribute within its spatial region domain. For instance, the measure may be whether it is present or absent (true or false), or, if it is present, by how much (sum or average), or in what form (parameter values).

The abstracted attribute information stored in each node is arranged in a predefined order as an attribute vector. The number and complexity of the attributes included in an attribute vector stored in a node tends to increase as its level in the data tree file increases. However, at a given level in the data tree file, the same attribute types are listed in the same order for all data domain nodes in that level.

In utilizing the search guide prepared in block 106 to make the guided search by block 100, the search begins with the attribute vector stored in the root node at the $H_n$ level of the data tree file. The ordered attribute list defined by this root-node attribute vector is checked to see if it contains attributes that are expected to be present if the relevant objects is somewhere in the image. If "yes", then the search process moves down the data tree file to examine the attribute vector of each integration domain at the next lower level of the hierarchy. If a match is again found in one of those domains, the search moves to the next lower level of the hierarchy, to examine the attribute vectors of all sub-domains that fall within the larger domain at the preceding level in which the target attributes were detected.

Detection of the requisite target attributes at the highest level of the hierarchy indicates that the target (i.e., relevant object) may be present in the image. It does not indicate just where, nor even that the attributes all are present in the right spatial configuration in the image to be associated with a relevant objects. Subsequent steps in the guided search determine whether the attributes occur together within increasingly smaller data domains, until the node level within the data tree file is reached at which the size of the data domain is just large enough to encompass the whole relevant objects.

Thus, the attribute hierarchy stored in the data tree file provides a graded image representation that allows the search process to move systematically from a purely attribute description of relevant objects to a purely spatial description. In this manner, a search over a relatively large spatial domain for a relatively small relevant objects is converted into direct indexing of the relevant objects as described in the attribute domain of the data tree file.

In the above description, the source image has been assumed to be a regular, two-dimensional array of samples. It may instead have just one dimension, or three or more dimensions. The dimensions need not be spatial. In vision applications, dimensions of orientation and scale are also typical. The data need not be distributed at regular intervals along these dimensions, although a regular distribution simplifies algorithm specification. In fact, the dimensions need not define a domain over which data are naturally organized. Rather, for some applications the data set may be unordered, but an arbitrary order is adopted for the purpose of preparing data for search.

The pooling operations used to construct levels of the abstraction hierarchy obtain the values for an attribute at a given parent node at level k by combining attributes of those level $k-1$ nodes that are in the support set, or children, of the given node. As above described, the support set C of level $k-1$ nodes that comprise each level k node is a compact set of $2 \times 2$ nodes, centered at the spatial location of its parent level k node. Further, this support set is "shift invariant" (i.e., the configuration of nodes that make up the support of one node of any level is that same as for all other nodes of that level, shifted to coincide with each node's position).

More generally, C may be different for all nodes (it should be the same for all attributes at a given node). Further, it need not represent a compact neighborhood. Rather, any "projection" from a relatively large number of nodes at level $k-1$ onto a smaller number of nodes at level k can be used. For example, each level k node may combine a column of data at level $k-1$. Also, the support sets for neighboring level k nodes may overlap at level $k-1$. There may be a weighing function, w, associated with the support set so that spatially nearer nodes contribute more strongly to the given node's attribute values.

The pooling operation may be a simple logical "or". Alternatively, any operation may be used that effectively combines the attributes of image regions to obtain the analogous attributes for the combined regions. For instance, a linear weighted sum may be used to summarize such attributes as mass, average gray value, or local energy. Also, a "max" operator may be used to summarize the largest attribute value in a region.

The extraction of abstracted information may comprise a logical "and" (i.e., combining a number of attributes at a given node or attributes of neighboring nodes). More generally, any operation that defines a new attribute in terms of previously defined attributes may be used. Examples include (1) more complex logical functions that combine "and", "or", and "not", and (2) both linear and non-linear arithmetic functions that compute weighted sums of scalar values. (As special cases, the pooling and extraction operations include the FIR filters used in constructing standard resolution pyramids.)

Both pooling and extraction operations are normally performed uniformly over all nodes at a given level of the hierarchy as part of the data preparation stage of the search performed by block 106. However, these operations may also be performed within restricted regions of the scene that are dynamically selected at "run time," should there be a priori information to indicate where targets are likely to occur.

The abstraction hierarchy is a distinct data structure from the usual resolution pyramid (described in the aforesaid Anderson et al. patent). However, in vision applications it will often be expedient to combine the resolution and abstraction structures. For example, a source image may first be decomposed into resolution components, then an abstraction hierarchy may be defined for each component. Alternatively, a resolution hierarchy may be constructed for any attribute image of an attribute hierarchy.

Pooling and extraction processes may be usefully repeated and intermixed in many complex ways. For example, extraction processes may be used to identify a given type of feature at each of a number of orientations. Then the pooling process may combine values over the multiple orientations, pooling in the orientation domain rather than in the spatial domain.

The attribute hierarchy is a data structure in which information about a source image is stored. The data structure is a set of attribute vectors, arranged in a hierarchy of arrays. Normally these arrays would be stored as vectors and arrays in a computer. In cases where arrays or vectors are sparse, it may be expedient to store data as lists of non-zero values and their locations.

In view of the foregoing generalizations, it is apparent that the organization of the hierarchy of data arrays contemplated by the present invention is not limited to that of a data tree file, such as that shown by FIG. 4. The data relationships between lower-level nodes and upper-level nodes of the hierarchy of data arrays contemplated by the present invention may be substantially different from and may be more complex than are provided by a data-tree type of data-relationship organization.

In general, the above-described principles of the present invention for preparing a search guide can be employed advantageously for increasing the speed and lowering the computation cost of both relatively simple and relatively complex guided searches for any type of one or more patterns, or an organization of such patterns, defined by graphical data of one or more dimensions, in accordance with a group of known multiple attributes exhibited by such patterns or organization thereof.

What is claimed is:

1. In a guided search method employing low-to-high resolution techniques for locating any of one or more various types of relevant objects that may be represented in relatively high-resolution graphical data that occupies a given data domain $H_n$, where $n \geq 1$; wherein each type of relevant objects exhibits a different combination of one or more of multiple predetermined attributes; the improvement comprising the step of employing high-to-low resolution techniques to prepare a search guide comprising a hierarchy of data arrays; wherein:

a certain level of said hierarchy of data arrays comprises respective nodes that individually correspond to each of a plurality of data domains $H_{k-1}$ into which said given data domain $H_n$ has been divided, each data domain $H_{k-1}$ being smaller than a data domain $H_k$, where $1 \leq k \leq n$ and $0 \leq (k-1) < n$;

another one of said data-tree node levels comprises at least one node that individually corresponds to a data domain $H_k$ which is comprised a group of $H_{k-1}$ data domains;

a first attribute vector is stored in the node corresponding to each $H_{k-1}$ data domain, which first attribute vector abstracts all attribute information defined by the graphical data contained in that $H_{k-1}$ data domain; and a second attribute vector, which pools the multiple attribute information stored by said first attribute vectors in all those nodes corresponding to the group of $H_{k-1}$ data domains that comprise each $H_k$ data domain, stores information abstracted from that group of $H_{k-1}$ data domains in the node corresponding to that $H_k$ data domain;

whereby a low-to-high resolution guided search may be made by employing the pooled abstracted multiple attribute information stored by the second attribute vector in a node corresponding to an $H_k$ data domain to select the attribute information stored by the first attribute vector of at least one of the nodes corresponding to the $H_{k-1}$ data domains of the group that comprises that $H_k$ data domain.

2. The method defined in claim 1, wherein said graphical data is comprised of an array of individual high-resolution data elements, the data domain of each of said individual data elements being $H_0$; and wherein the step of employing high-to-low resolution techniques to prepare a search guide includes the steps of:

a) dividing said given domain $H_n$ into a plurality of said data domains $H_{k-1}$;

b) separately processing the data of each of said plurality of data domains $H_{k-1}$ to abstract information as to whether any and, if so, which of said predetermined attributes of said relevant objects are defined thereby, and then storing the abstracted information as a first attribute vector in that $H_{k-1}$ node of the $H_{k-1}$ level of said hierarchy of data arrays that corresponds to that $H_{k-1}$ data domain; and (c) pooling the multiple attribute information stored by the first attribute vectors in those nodes corresponding to the individual $H_{k-1}$ data-domain group that comprises that $H_k$ data domain, and storing information abstracted from that group of $H_{k-1}$ data domains in the node corresponding to that $H_k$ data domain.

3. The method defined in claim 2, wherein k has an initial value equal to one, whereby (k−1) has an initial value equal to zero, wherein n has a given value greater than one; and wherein said method further comprises the step of:

(d) cyclically repeating steps (a), (b) and (c), with the value of k during each repeated cycle being one higher than the value of k during the immediately preceding cycle, until the value of k on the last cycle is equal to n;

whereby the highest level of said hierarchy of data arrays comprises a single node corresponding to said given data domain $H_n$ and the lowest level of said hierarchy of data arrays comprises of a group of nodes that individually correspond to each of a plurality of said data domains $H_0$, and a guided search may be made starting with the pooled abstracted multiple attribute information defined by the second attribute vector stored in said single node of said highest level of said hierarchy of data arrays and proceeding therefrom toward the respective abstracted information defined by the first attribute vector stored in any selected one of said group of nodes of the lowest level of said hierarchy of data arrays in accordance with the pooled abstracted information defined by the second attribute vector stored in each node of said hierarchy of data arrays antecedent to that selected one of said group of nodes.

4. The method defined in claim 3, wherein:

said hierarchy of data arrays is a complete data-tree file which includes a plurality of node levels in which the root node of said data-tree file corresponds to said node of said highest level of said hierarchy of data arrays and said leaf nodes of said data-tree file corresponds to said group of nodes of said lowest level of said hierarchy of data arrays.

5. The method defined in claim 1, wherein:

said other one of said levels of the hierarchy of data arrays comprises at least one node that individually corresponds to a data domain $H_k$ which comprises a group of adjacent $H_{k-1}$ data domains.

6. The method defined in claim 1, wherein:

said graphical data is comprised of two-dimensional image data.

7. The method defined in claim 6, wherein:

said other one of said levels of the hierarchy of data arrays comprises at least one node that individually corresponds to an image-data domain $H_k$ which comprises a group of adjacent $H_{k-1}$ image-data domains 8. The method defined in claim 7, wherein:

said other one of levels of the hierarchy of data arrays comprises at least one node that individually corresponds to an image-data domain $H_k$ which is comprised of a $2 \times 2$ group of adjacent $H_{k-1}$ image-data domains.

9. The method defined in claim 1, wherein:

each of said multiple attributes is of a different given type and exhibits a certain value.

10. The method defined in claim 1, wherein:

said first attribute vector stored in the node corresponding to each one of the $H_{k-1}$ data domains of the $H_{k-1}$ level of the hierarchy of data arrays lists the abstracted attribute information of which comprises it arranged in the same predefined order as said first attribute vector stored in the node corresponding to each other of the $H_{k-1}$ data domains of the $H_{k-1}$ level of the data-tree file lists the abstracted attribute information which comprises it.

11. The method defined in claim 10, wherein:

said second attribute vector stored in the node corresponding to each one of the $H_k$ data domains of the $H_k$ level of the hierarchy of data arrays lists the abstracted attribute information which comprises it arranged in the same second predefined order as said second attribute vector stored in the node corresponding to each other of the $H_{k-1}$ data domains of the $H_{k-1}$ level of the data-tree file lists the abstracted attribute information which comprises it.

12. The method defined in claim 11, wherein:

said second predefined order is different from said first-mentioned predefined order.

* * * * *